US010065223B2

(12) United States Patent
Klock

(10) Patent No.: US 10,065,223 B2
(45) Date of Patent: Sep. 4, 2018

(54) METHOD AND SYSTEM FOR THE IN-SITU DECONTAMINATION OF CONTAMINATED SOILS

(71) Applicant: Benjamin Klock, Ulm (DE)

(72) Inventor: Benjamin Klock, Ulm (DE)

(73) Assignee: Geo-Bohrtechnik GmbH, Blaustein/Bermaringen (DE)

( * ) Notice: Subject to any disclaimer, the term of this patent is extended or adjusted under 35 U.S.C. 154(b) by 0 days.

(21) Appl. No.: 15/188,269

(22) Filed: Jun. 21, 2016

(65) Prior Publication Data

US 2017/0157654 A1    Jun. 8, 2017

(30) Foreign Application Priority Data

Dec. 3, 2015   (DE) .......................... 10 2015 121 042

(51) Int. Cl.
| | |
|---|---|
| *B09C 1/00* | (2006.01) |
| *B09C 1/08* | (2006.01) |
| *B09C 1/10* | (2006.01) |
| *C02F 3/00* | (2006.01) |

(52) U.S. Cl.
CPC ................. *B09C 1/08* (2013.01); *B09C 1/00* (2013.01); *B09C 1/10* (2013.01); *C02F 3/00* (2013.01); *B09C 1/002* (2013.01); *B09C 2101/00* (2013.01)

(58) Field of Classification Search
CPC .. B09C 1/00; B09C 1/002; B09C 1/08; B09C 1/085; B09C 2101/00
USPC ............................................ 405/128.1–128.9
See application file for complete search history.

(56) References Cited

U.S. PATENT DOCUMENTS

| | | | | |
|---|---|---|---|---|
| 3,062,294 A | * | 11/1962 | Huitt ..................... | E21B 43/112 166/177.5 |
| 3,746,088 A | * | 7/1973 | Haskin ..................... | E21B 7/14 166/300 |
| 4,372,386 A | * | 2/1983 | Rhoades ................ | C09K 8/592 165/45 |
| 4,582,611 A | * | 4/1986 | Wang ..................... | B01D 29/15 210/170.07 |

(Continued)

FOREIGN PATENT DOCUMENTS

| | | |
|---|---|---|
| DE | 3811714 C1 | 10/1988 |
| DE | 4112893 A1 | 8/1992 |

(Continued)

OTHER PUBLICATIONS

Edel, H. G. et al, "In-situ chemische Oxidation (ISCO) Erfahrungen aus einer erfolgreichen Herdsanierung", Handbuch zur Altlastensanierung, C.F. Mueller Verlag, 3rd edition, Feb. 2011.

(Continued)

*Primary Examiner* — Benjamin F Fiorello
*Assistant Examiner* — Edwin J Toledo-Duran
(74) *Attorney, Agent, or Firm* — Edell, Shapiro & Finnan, LLC

(57) ABSTRACT

A method and an associated system for in-situ decontamination of a contaminated soil region (2) which contains degradable pollutants, in which a fluid substance is introduced into the soil (1) using an injection device (4, 4'), wherein the fluid substance is introduced into the soil using a pressure injection method in a pressure-controlled manner and/or with an injection device that has a valve pipe with a pressure-controlled outlet valve.

17 Claims, 3 Drawing Sheets

(56) References Cited

U.S. PATENT DOCUMENTS

| | | | | |
|---|---|---|---|---|
| 4,641,710 A * | 2/1987 | Klinger | ............... | E21B 36/00 |
| | | | | 166/266 |
| 5,011,329 A * | 4/1991 | Nelson | ............... | B09C 1/06 |
| | | | | 405/128.65 |
| 5,018,576 A * | 5/1991 | Udell | ............... | B09C 1/005 |
| | | | | 166/246 |
| 5,054,961 A * | 10/1991 | Sherman | ............... | B09C 1/00 |
| | | | | 405/128.15 |
| 5,120,160 A * | 6/1992 | Schwengel | ............... | E21B 43/305 |
| | | | | 405/128.45 |
| 5,286,141 A * | 2/1994 | Vigneri | ............... | B01F 3/0865 |
| | | | | 210/170.07 |
| 5,416,257 A * | 5/1995 | Peters | ............... | E02D 19/14 |
| | | | | 405/128.15 |
| 5,476,992 A * | 12/1995 | Ho | ............... | B09C 1/085 |
| | | | | 204/515 |
| 5,560,737 A * | 10/1996 | Schuring | ............... | B09C 1/00 |
| | | | | 166/246 |
| 5,570,973 A * | 11/1996 | Hunt | ............... | B09C 1/002 |
| | | | | 166/246 |
| 5,586,213 A * | 12/1996 | Bridges | ............... | B09C 1/062 |
| | | | | 166/248 |
| 5,615,974 A * | 4/1997 | Land | ............... | B09C 1/005 |
| | | | | 405/128.35 |
| 5,641,020 A * | 6/1997 | Cherry | ............... | B09C 1/00 |
| | | | | 166/250.1 |
| 5,810,514 A * | 9/1998 | Suchecki, Jr. | ............... | B09C 1/00 |
| | | | | 166/246 |
| 5,833,388 A * | 11/1998 | Edwards | ............... | B09C 1/002 |
| | | | | 405/52 |
| 5,868,523 A * | 2/1999 | Nickell | ............... | B09C 1/00 |
| | | | | 111/7.4 |
| 5,879,107 A * | 3/1999 | Kiest | ............... | B09C 1/00 |
| | | | | 210/611 |
| 5,944,446 A * | 8/1999 | Hocking | ............... | B09C 1/08 |
| | | | | 166/308.1 |
| 5,980,446 A * | 11/1999 | Loomis | ............... | B09B 1/00 |
| | | | | 405/129.45 |
| 5,986,159 A | 11/1999 | Aines et al. | | |
| 6,102,621 A * | 8/2000 | Siegrist | ............... | B09C 1/00 |
| | | | | 405/128.5 |
| 6,158,924 A * | 12/2000 | Athens | ............... | B09C 1/002 |
| | | | | 166/268 |
| 6,207,114 B1 * | 3/2001 | Quinn | ............... | B09C 1/002 |
| | | | | 175/19 |
| 6,268,205 B1 * | 7/2001 | Kiest | ............... | B09C 1/08 |
| | | | | 210/631 |
| 6,306,296 B1 * | 10/2001 | Kerfoot | ............... | B01F 3/04262 |
| | | | | 210/170.07 |
| 6,357,968 B1 * | 3/2002 | Dwyer | ............... | E02D 3/12 |
| | | | | 405/128.1 |
| 6,457,905 B1 * | 10/2002 | Nickell | ............... | B09C 1/00 |
| | | | | 111/7.4 |
| 6,818,136 B1 * | 11/2004 | Marek | ............... | B09C 1/002 |
| | | | | 210/170.07 |
| 2009/0301704 A1 * | 12/2009 | Dillett | ............... | E21B 43/24 |
| | | | | 166/50 |
| 2010/0000737 A1 * | 1/2010 | Ramakrishnan | .... | E21B 41/0064 |
| | | | | 166/297 |

FOREIGN PATENT DOCUMENTS

| | | |
|---|---|---|
| DE | 4428936 A1 | 2/1995 |
| DE | 10217373 A1 | 11/2003 |
| DE | 102006057299 A1 | 6/2008 |
| DE | 202010005812 U1 | 7/2010 |
| DE | 102012204743 B4 | 3/2015 |
| EP | 0780166 A1 | 6/1997 |
| EP | 1361002 A2 | 11/2003 |

OTHER PUBLICATIONS

Kutzner, C., "Valve pipe and valve pipe process", Enke, Jan. 1991 (English language version of reference entitled "Injektionen im Baugrund", previously submitted in IDS of Jun. 21, 2016.).

Keller Grundbau GmbH, International Geotechnical Contractors, "The Soilfrac Process", Jul. 2013, www.kellergrundbau.com.

Katzenbach, R., "Handbuch des Spezialtiefbaus: Geraete and Verfahren", German Federal Gazette, BUJA/Katzenbach 2nd. Edition Jan. 2001.

English language translation of Office Action in corresponding German Application No. 102015121042.8, dated Jul. 8, 2016.

International Search Report and Written Opinion in counterpart International Application No. PCT/EP2016/079673, dated Mar. 13, 2017, with partial translation and key, 13 pages + 1 page.

* cited by examiner

METHOD AND SYSTEM FOR THE IN-SITU DECONTAMINATION OF CONTAMINATED SOILS

CROSS REFERENCE TO RELATED APPLICATIONS

This application claims foreign priority under 35 U.S.C. § 119(a)-(d) to Application No. DE 10 2015 121 042.8 filed on Dec. 3, 2015, the entire contents of which are hereby incorporated by reference into this application.

FIELD OF THE INVENTION

The invention relates to a system for the in-situ decontamination of soil and/or water/groundwater having a contaminated soil region which contains degradable pollutants, as known for example from DE 20 2010 005 812 U1.

BACKGROUND

The decontamination of contaminated soil and/or ground water is an important topic of current interest. Many technical methods have already been developed as solutions. Because the areas to be decontaminated are often developed areas, the so-called in-situ methods are particularly important because they provide decontamination of the contaminated soil and/or water on-site without having to excavate the relevant soil region.

A particularly effective method for the in-situ decontamination of soils which are contaminated with organic pollutants is so-called in-situ chemical oxidation (ISCO). The functional principle of in-situ chemical oxidation is based on suitable chemical oxidants being introduced into and distributed in the soil. Therefore, in particular petroleum-derived hydrocarbons, aliphatic hydrocarbons, volatile chlorinated/halogenated hydrocarbons or even polycyclic aromatic hydrocarbons in the soil can be degraded. Owing to chemical reactions of the oxidant in the soil, oxygen is released, whereby degradation processes are promoted and accelerated, in order to eliminate the present pollutants in-situ. The method is explained, for example, in the publication "*In-situ chemische Oxidation: Erfahrungen aus der Herdsanierung*"(*Handbuch zur Altlastensanierung*, C. F. Müller Verlag, 3rd edition, February 2011). Furthermore, the use of ISCO for in-situ decontamination of soils is described in DE 20 2010 005 812 U1 which provides seminal disclosure regarding this technology.

In-situ chemical oxidation is particularly suitable for source-zone decontamination in response to average to high concentrations of pollutants. A particular advantage of in-situ chemical oxidation over alternative known methods is the shortened decontamination time. The oxidant is introduced into the decontamination areas using hydrostatic pressure and is injected into the soil region to be treated, for example using injection lances, as described in DE 20 2010 005 812 U1.

Although the method is, in principle, highly suitable for soil decontamination, it has been shown in practice that the soil decontamination with the aid of in-situ chemical oxidation using conventional injection lances does not produce the desired success. This is due to the fact that when injecting the oxidant using conventional injection lances, the reagents often do not sufficiently penetrate into the soil to be treated, and therefore co-reactants frequently do not come into reactive contact and as a result the amount of decontamination is often insufficient. The chemical degradation of the pollutants occurs instead via a second order reaction. This means that at low concentrations of the oxidant or the pollutant, the degradation rate is also greatly reduced. Owing to inhomogeneous soil properties, heterogeneous pollutant distributions and the pollutant properties themselves, which are often difficult to predict, an increased active radius of the oxidant is required in many situations, which cannot be achieved with the conventional injection technology. In particular, it has been established that in the presence of soil layers having low hydraulic permeability and/or of rock formations, satisfactory decontamination cannot be achieved because such poorly permeable soils cannot be successfully decontaminated or require extremely long decontamination time periods, due to the extremely low flow speeds of the groundwater.

SUMMARY

One object of the invention is to further develop the known systems for soil decontamination in such a manner that the degree of decontamination is increased. A further object is to provide soil decontamination systems which are successful from an economic point of view, even in the case of difficult soil conditions.

These and other objects are achieved by the systems and methods as recited in the independent claims. Advantageous embodiments are described in the dependent claims.

In accordance with one formulation of the invention, a fluid substance is injected into the soil using a pressure injection method and in a pressure-controlled manner. For this purpose, a pressure-controlled injection device is used. Since the fluid substance is introduced at increased pressure in surges, the fluid substance reaches the soils to be treated substantially more quickly than in the prior art and the soils come into contact with the fluid substance, which means that slow "pump and treat" measures can be dispensed with. The increased pressure is advantageous for soil decontamination, which is efficient from an economic point of view because the fluid substance can be distributed over a large decontamination region with a minimum amount being used. Therefore, the use of the method in accordance with the invention permits considerable time- and costs-savings. Furthermore, owing to the pressure-controlled injection, the method enables penetration of the fluid substance to be achieved even in poorly permeable soils. The working pressure varies between 2 and 100 bar, in particular between 2 and 30 bar, in dependence upon the soil permeability and pollutant distribution. Depending upon the application, single or multiple deep injection can occur in order to inject the oxidant as deep as possible into the soil to be treated.

The technique of pressure injection is a common method from the field of special underground engineering and is used therein to harden the soil. The method is described, for example, in "*Handbuch des Spezialtiefbaus: Geräte und Verfahren*", ed. Rolf Katzenbach, German Federal Gazette. In special underground engineering, a flowable filler (typically a cement mixed with water or a synthetic resin) is used and is injected into cavities and pores of the foundation soil and is hardened or solidified therein depending upon the engineering problem to be solved. Therefore, one important aspect of the invention is to adapt a method, which is used in special underground engineering for stabilising the foundation subsoil, in such a manner that the method can be used to decontaminate soil using a fluid substance.

The fluid substance can be an oxidant for in-situ chemical oxidation.

In in-situ chemical oxidation (ISCO), the pollutants are chemically degraded by oxidation in the subsoil by infiltration of an oxidant. By using suitable oxidants, which can have the most varied compositions and aggregation states, different organic pollutants can be eliminated from the soil, groundwater or wastewater by chemical oxidation. The oxidants used can be in particular mixtures of a plurality of components. In an expedient manner, these components are mixed directly on site in order to obtain the oxidant. Compared with biological degradation, the reaction of the chemical oxidation occurs extremely rapidly. Potassium or sodium permanganate, the so-called Fenton's reagent, hydrogen peroxide or ozone are used as the oxidant. An important criterion for the applicability of a particular oxidant is the long-life cycle: although rapidly decomposing oxidants frequently have a higher reactivity, this only lasts for a short time, and therefore for highly effective purification it must be ensured that the oxidant rapidly enters the soil region to be treated.

A common, relatively long-life oxidant is permanganate, in particular potassium permanganate in aqueous solution; it is conventionally used for diffusive penetration into soil regions through which it is difficult for media to flow. However, the duration of the active ingredient application is typically short compared with how long the pollution lasts. Therefore, the pollutants have penetrated much, much further into the poorly permeable regions than the oxidant could within the time-frame in which it is effective and thus escape the treatment by the oxidant. The pressure-controlled injection of oxidants in accordance with the invention is associated with great advantages because in this method a liquid or even highly-viscous oxidant can be injected into the soil in surges and also at precise depth horizons. As a result, soil layers in decontamination regions, which layers are located further away and are poorly permeable, can be reached. If pollutants to be decontaminated have accumulated in poorly permeable intermediate layers, they can also be treated with the oxidant using the pressure injection in accordance with the invention at precise depth horizons because the relevant valve position can be fixed accordingly in the subsoil to be decontaminated. Owing to the comparatively long lifetime of permanganate, the components of the oxidant can be already mixed before the oxidant is introduced into the injection device; however, in an advantageous embodiment, the mixing device to be used is arranged in the immediate vicinity of the injection device in order to avoid long transport paths for the oxidant.

A further known oxidant is the previously mentioned "Fenton's reagent", a mixture of hydrogen peroxide $H_2O_2$ with iron(II)-salt ($FeSO_4$), which forms hydroxyl radicals in an acid solution (e.g. $H_2SO_4$). Since Fenton's reagent decomposes rapidly, this oxidant can conventionally only be used in soils having good permeability. In soils in which there are widespread inhomogeneities with many regions of poor permeability, the reagent could not be effective in the targeted contaminated regions because it would have already decomposed before penetrating into these regions. By using the pressure-controlled injection in accordance with the invention, a short-lived oxidant such as Fenton's reagent can also be successfully used in soils with poor permeability because it is injected at elevated pressure and thus quickly enters the soil regions to be treated. Owing to the short decomposing time, in this case it is advantageous to introduce the components separately into the interior of the injection device and to mix them only just prior to carrying out the injection process.

An alternative to the soil decontamination using in-situ chemical oxidation by different oxidants is the use of a fluid substance which is a culture medium for micro-organisms. It is generally known that micro-organisms can metabolise virtually all substances. If a culture medium for micro-organisms, such as e.g. molasses from sugar cane, sugar beets and/or sugar millet, is injected into the soil to be decontaminated, then the formation of micro-organisms can be encouraged, which micro-organisms are in turn able to metabolise the pollutants located therein and substantially reduce the degree of decontamination.

In order to perform the above-described method, a system having a valve pipe having a pressure-controlled outlet valve and an injection device configured to be introduced into the soil can be used, and with which the fluid substance can be injected into the soil at elevated pressure. In particular, the system preferably comprises a mixing device for producing the fluid substance, more particularly the oxidant consisting of a plurality of components.

Advantageously, the fluid substance is injected into the soil using a valve pipe designed as a sleeve pipe. Sleeve pipes are injection devices known from special underground engineering and are used therein in order to increase the solidity of the foundation soil and in this manner increase the bearing capacity of the subsoil or reduce its deformability. Sleeve pipes are plastic or steel pipes which are provided with openings at predetermined distances. The openings are covered by a sleeve which can be formed of a correspondingly selected material depending upon the application, such as e.g. a rubber or a synthetic material, said sleeve expanding in the manner of a valve under the injection pressure and allowing the injection medium to exit through the openings into the surrounding area. By using such a sleeve pipe, the oxidant can be injected into the soil in a pressure-controlled manner at injection pressures of up to 15 to 80 bar depending upon the design of the rubber sleeve. Sealing rings, so-called double packers, which can be activated in a controlled manner, are provided in the interior of the sleeve pipe and ensure that the fluid substance is injected into the desired soil region when pressure is exerted. In this manner, an extremely high horizontal penetration of the fluid substance into the soil/groundwater to be decontaminated via the respective injection bore can be achieved even in the case of subsoil having low hydraulic permeability.

Furthermore, the outer wall of the valve pipe is advantageously provided in the region of the outlet valve with radially protruding collars, so-called horizontal bars. These horizontal bars ensure that the fluid substance injected in a pressure-controlled manner is injected into the contaminated soil layers in a horizontal and depth-oriented manner. The horizontal bars prevent hydraulic short-circuits and thus allow the fluid substance to be introduced at a higher working pressure.

BRIEF DESCRIPTION OF THE DRAWINGS

The invention will be described in more detail hereinafter with the aid of the figures. In the figures.

Figure 1:
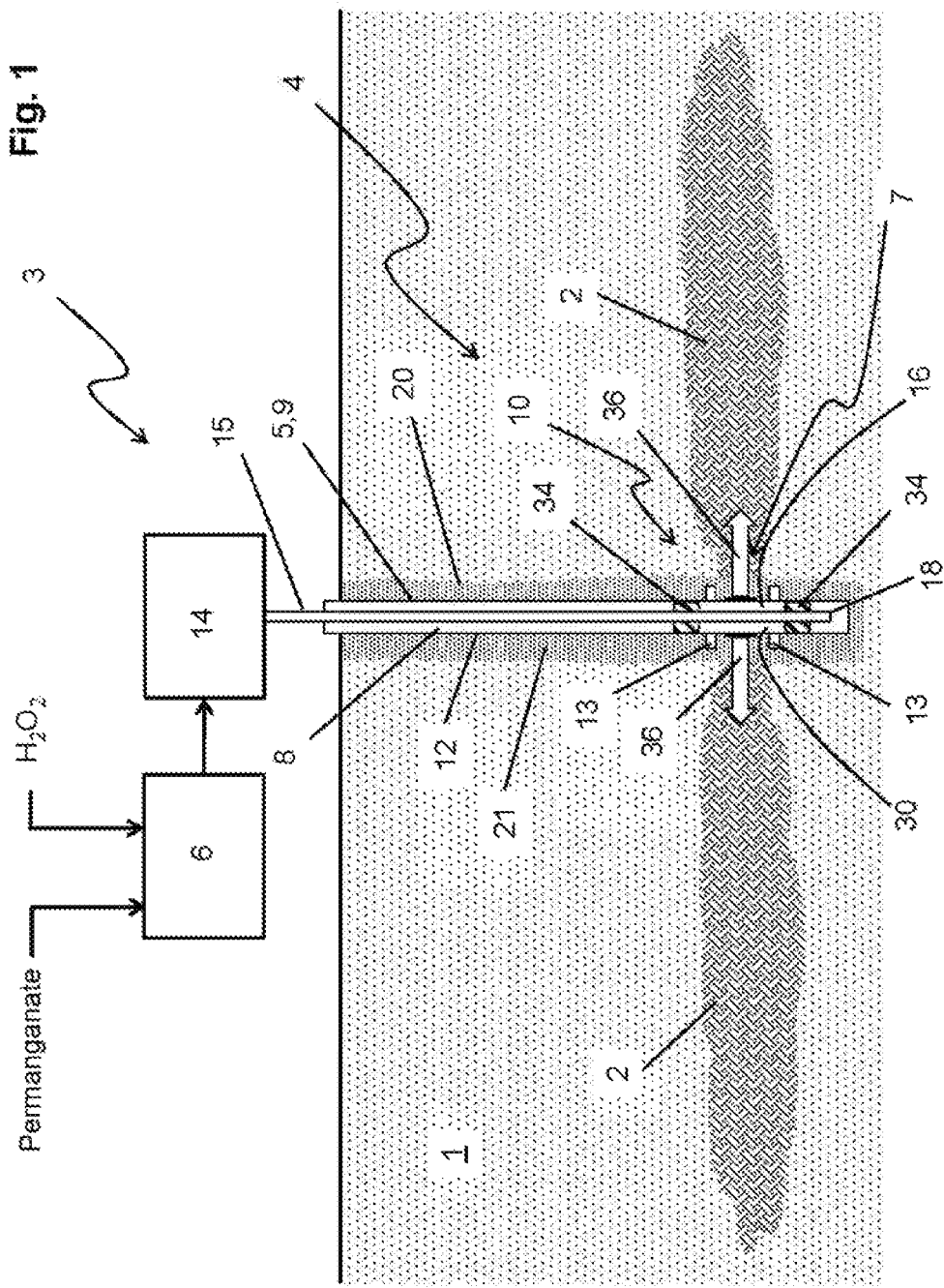
FIG. 1 shows a schematic illustration of a system for in-situ chemical oxidation using a valve pipe introduced into the soil, in a first embodiment.

In the drawings, elements which correspond to each other are designated with the same reference numerals. The drawings illustrate a schematic exemplified embodiment and do not reproduce any specific parameters of the invention. Furthermore, the drawings are merely used to explain an advantageous embodiment of the invention and are not to be interpreted as limiting the scope of protection of the invention.

DETAILED DESCRIPTION

FIG. 1 shows a system 3 for injecting, in a pressure-controlled manner, an oxidant in a soil 1 which includes a contaminated soil region 2 to be treated. The impurities in the soil region 2 consist at least in part of pollutants which can be treated using in-situ chemical oxidation.

The oxidant is injected in a pressure-controlled manner using an injection device 4 having a valve pipe 5 which is introduced into the soil 1 and includes at least one outlet valve 7 which is controlled with pressure. In the present exemplified embodiment, the valve pipe 5 is designed as a sleeve pipe 9. The sleeve pipe 9 (see detailed illustration in FIG. 3) is a hollow body consisting of synthetic material or steel and provided with openings 31 in one (or more) outlet region(s) 30. In the present exemplified embodiment, the sleeve pipe 9 includes a single outlet region 30, the lateral extent and position of which on the sleeve pipe 9 is adapted to the geometric shape of the soil region 2 to be treated. The openings 31 are covered with a sleeve 32, e.g. a rubber sleeve, which expands upon reaching a predetermined injection pressure, thus permitting the oxidant introduced through the sleeve pipe 9 to exit through the openings 31 into the surrounding area. The openings 31 and the sleeve 32 thus together form a sleeve valve 10 which can be opened and closed in a pressure-controlled manner. By using such a sleeve valve 10, the oxidant can be injected in a pressure-controlled manner at injection pressures of up to 15 to 30 bar depending upon the design of the sleeve 32. If a plurality of soil regions 2 at different depths are to be treated using in-situ chemical oxidation, then the sleeve pipe 9 expediently comprises a plurality of axially spaced-apart sleeve valves 10 which are arranged on the sleeve pipe 9 in a manner that corresponds to the specific application to which the injection device 4 is being put.

The oxidant is conveyed into an interior 8 of the sleeve pipe 9 via an injection line 15. The injection line 15 is closed at its end 18 introduced into the soil 1 and comprises an injection region 16 having openings 17, via which the oxidant is introduced into the outlet region 30 of the sleeve pipe 9. In order to ensure that the desired injection pressure builds up in the outlet region 30 of the sleeve pipe 9, the interior 8 of the sleeve pipe 9 is provided with a so-called double packer 33 which includes two sealing sleeves 34 which expand in a controlled manner and surround the injection line 15 annularly, wherein sealing sleeves 34 are arranged respectively below and above the outlet region 30. In the active state, these sealing sleeves 34 terminate the outlet region 30 at the bottom and at the top and prevent the oxidant from axially escaping from the outlet region 30. After the oxidant has been injected, the expansion of the sealing sleeves 34 of the double packer 33 can be reversed by pressure relief. The double packer 33 can then be displaced within the valve pipe 5 so that—when a plurality of sleeve valves 10 are utilized—the injection can be controlled and repeated as often as necessary in different regions.

The sealing sleeves 34 can be expanded in particular in a hydraulic manner. For instance, an expansion tube (not shown in FIG. 3) is connected to the sealing sleeves 34 and is used to supply a hydraulic medium. Alternatively, sealing sleeves 34 which are actuated in a pneumatic, electric or mechanical manner can also be provided.

In order to prepare for the soil treatment using in-situ chemical oxidation, in a first step a hole 20 having a depth which reaches at least as far as the soil region 2 to be treated is produced by pile driving, vibrating or boring in the soil 1. The sleeve pipe 9 is then introduced into this hole 20, which typically has a diameter of 80 to 150 mm, to such a depth that the outlet region 30 of the sleeve valve 10 is located in the soil region 2 to be treated. The annular space formed between an inner wall of the hole 20 and an outer wall 12 of the sleeve pipe 9 is then filled with a hardenable sheathing compound consisting of e.g. water, cement and bentonite. After hardening of the sheathing compound, this forms a casing 21 around the sleeve pipe 9 which fixes the sleeve pipe 9 in position.

The oxidant can now be injected into the soil region 2. For this purpose, the double packer 33 and the injection line 15 are inserted into the sleeve pipe 9 to such a depth that the double packer 33 and the injection region 16 of the injection line 15 lie opposite the sleeve valve 10 of the sleeve pipe 9 (see FIG. 3). In this position, the sealing sleeves 34 are now clamped, whereby the sealing pipe 9 is sealed at the top and bottom in the region of the double packer 33. Then, the oxidant is injected through the injection line 15 using a high-pressure pump 14, more particularly a high-pressure piston pump. The pressure in the annular space formed between the sealing sleeves 34 increases until the sheathing material of the casing 21 breaks open upon reaching the injection pressure in the outlet region 30 of the sleeve pipe 9 and the oxidant is injected into the surrounding soil 2 at high pressure through the perforations 31 in the sleeve pipe 9 (arrow 36). Therefore, the oxidant is injected in a pressure-controlled manner. In order to ensure that the oxidant is injected in the horizontal direction into the soil region 2 to be treated, the outer wall 12 of the valve pipe 5 can be provided, below and above the outlet region 30, with radially protruding, preferably annular horizontal bars 13. These horizontal bars 13 concentrate the flow of oxidant in the radial direction and ensure precise placement of the oxidant in the soil region 2 to be treated.

In order to treat laterally extended soil regions 2, it is expedient to introduce a plurality of laterally mutually offset valve pipes 5 into the soil 1, whereby the arrangement of the valve pipes is adapted to the outline of the distribution of the pollutants in the soil region 2. The distance between the valve pipes 5 is dependent upon the permeability of the soil 2 to be treated and the type and properties of the oxidant. The pressure building up during the injection process is an important indication for the propagation of the oxidant in the soil 2 and is thus continuously monitored during the injection process.

Different fluids which are produced by mixing a plurality of components can be used as the oxidant. The term "fluid" is intended to mean a flowable substance, in particular a supercritical fluid, a liquid or a liquid mixture, e.g. an emulsion, a solution or a liquid provided with solids. The oxidant must be selected such that it is suitable for degrading the pollutants contained in the soil region 2 and is adapted to the geochemical conditions.

In the exemplified embodiment in FIG. 1, a permanganate, in particular potassium permanganate, with water is used as the oxidant. Generally speaking, some of the substances used as starting materials for producing the oxidant are explosive, combustible and/or toxic substances and must therefore be stored physically separate from one another and in compliance with specific safety protocols. In the present exemplified embodiment, the starting materials permanganate and $H_2O$ are supplied to a central mixing device 6 via separate metering devices just before being introduced into the soil region 2. The oxidant is then prepared in this mixing device by mixing these two components. The mixture produced from the two components in the mixing device 6 is then fed directly to the high-pressure pump 14, which pumps the mixture into the injection line 15 under pressure.

The targeted and safe introduction of the oxidant into the subsoil is a formidable challenge. As already mentioned, common oxidants are highly reactive reagents and are thus hazardous substances. Therefore, depending upon the oxidant used, various technical and structural fire/explosion protection constraints imposed to ensure safe operation must be satisfied. This is achieved through various systems technologies that are provided with process-integrated technical safety measures, which, in turn, permit the systems to be used safely and which satisfy the various applicable safety requirements.

Figure 2:
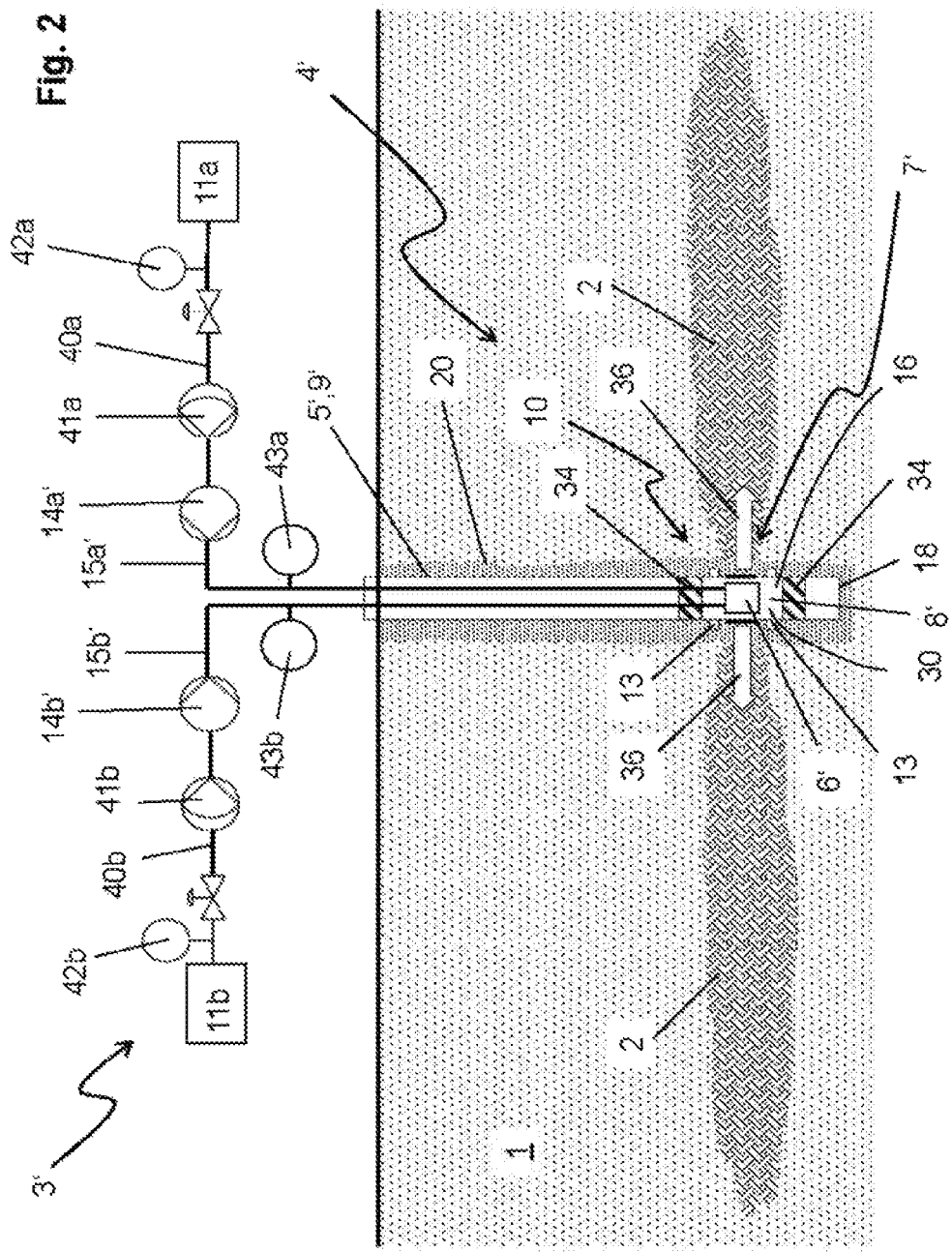
FIG. 2 shows a schematic illustration of a system for in-situ chemical oxidation in a second embodiment.

FIG. 2 shows an alternative embodiment of a system 3' for injecting an oxidant in a pressure-controlled manner into the contaminated soil region 2 which is to be treated using in-situ chemical oxidation, and is suitable in particular for cases in which a short-lived oxidant, more particularly Fenton's reagent, is to be used.

The oxidant Fenton's reagent is produced by activating $H_2O_2$ with $Fe^{2+}$. Hydroxyl radicals having an extremely high redox potential are thereby produced. Concentrated $H_2O_2$ solutions are generally used as the starting product, and are activated by $FeSO_4$ solutions. The hydroxyl radical is very unstable and breaks down quickly in the subsoil. When using the conventional injection processes, the radical can thus only be transported over short distances and has a small radius of action that extends over only a few meters.

By using the pressure-controlled injection in accordance with the invention, Fenton's reagent can be injected into the ground in surges at a higher pressure, whereby the area of action can be considerably increased. Furthermore, in the system 3' in FIG. 2—in contrast to the exemplified embodiment in FIG. 1—the individual components are mixed in a mixing device 6' which is arranged within the valve pipe 5, and therefore mixing does not occur until shortly before the expulsion of the oxidant into the soil 2. In this manner, the reaction time is utilized in an optimum manner because the oxidant is injected into the soil 2 straight after mixing.

As can be seen in FIG. 2, the starting substances for Fenton's reagent are stored in physically separate tanks 11a and 11b. The $FeSO_4$ solution is fed from the tank 11a via a line 40a and a metering pump 41a into a first injection line 15a' whereas the $H_2O_2$ solution is fed from the tank 11b via a line 40b and a metering pump 41b into a second injection line 15b'. Flowmeters 42a, 42b are provided in the lines 40a, 40b and can control the supplied amounts. A high-pressure pump 14a', 14b' is arranged in each of the injection lines 15a', 15b', and therefore the two components are compressed separately and are conveyed separated through the interior 8' of the sleeve pipe 9 to a mixing device 6', where they are mixed to produce Fenton's reagent and—similarly to the exemplified embodiment described in FIG. 1—are injected into the soil 2 through the sleeve valve 10. The pressure and through-flow are measured using sensors 43a, 43b. Therefore, the mixing of the components $FeSO_4$ and $H_2O_2$ to produce the oxidant Fenton's reagent takes place in this exemplified embodiment just before the injection into the soil 1 via the sleeve valve 10, and therefore the oxidant decomposes to only a minimal extent before the oxidant starts to act on the soil region 2. If need be, supply lines for further reagents (such as e.g. $H_2SO_4$) or purification media can be provided. The closed injection system is designed for a working pressure of at most 100 bar.

In addition to the features shown in the figures, the overall system 3, 3' of FIGS. 1 and 2 comprises a control unit (not shown in the figures) for in-process control, which controls, in a fully-automatic manner, the metering of the individual components, the mixing process, the charging of the pumps 14, 14a', 14b' and the injection process on the basis of the measurement values from a multiplicity of sensors provided in the system (for pressure, through-flow amount, etc.). For instance, in particular the injection line 15, 15a', 15b'—as illustrated in FIG. 2—is advantageously provided with sensors for pressure, through-flow, temperature and pH/redox potential values. During the injection process, the course of the injection is monitored in time and space, wherein the through-flow of the oxidant or the supplied components, the electrical conductivity and/or pH/redox potential are measured. Furthermore, preferably, the injection line can be flushed with osmosis water and the injection system has an exhaust system.

Figure 3:
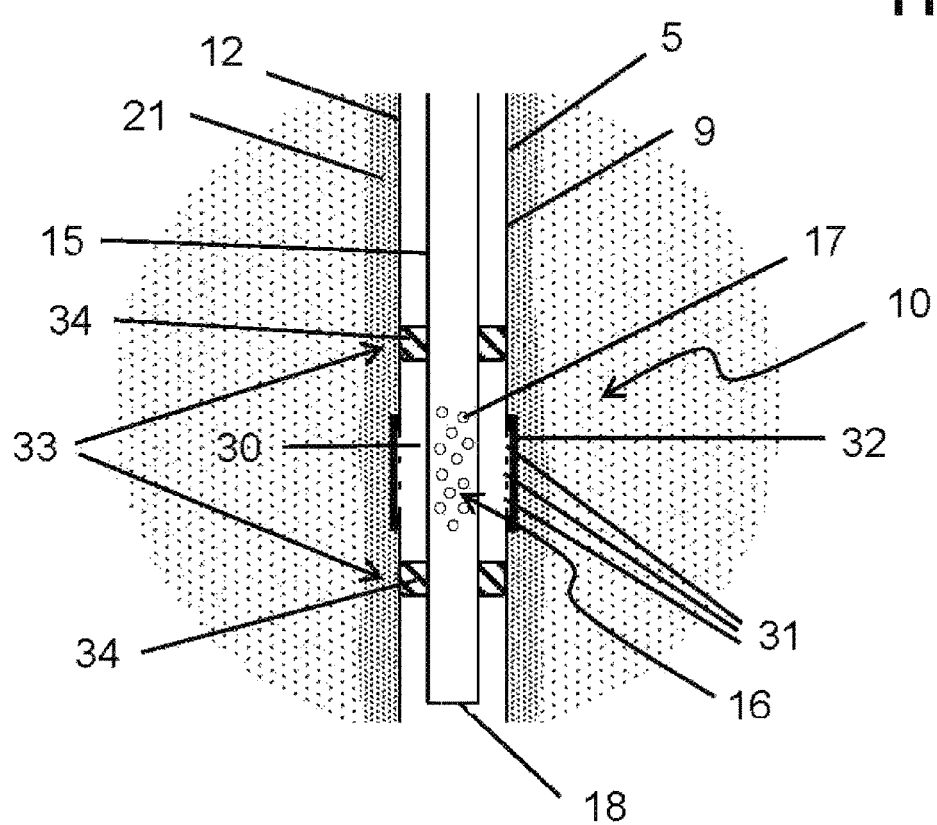
FIG. 3 shows a detailed illustration of a section of the valve pipe from FIG. 1.

The systems 3 and 3' shown in FIGS. 1 to 3 for the pressure-controlled injection of an oxidant into a soil 1, which includes a contaminated soil region 2 to be treated, can likewise be used for the pressure-controlled injection of a culture medium for micro-organisms, as stated above.

What is claimed is:

1. A method for in-situ decontamination of a contaminated soil region which contains pollutants degradable with a decontaminating fluid substance through chemical oxidation, comprising:
    selecting, with an injection device, an injection pressure from a plurality of available injection pressures,
    introducing a first component of the fluid substance via a first conduit to a depth of the contaminated soil region,
    introducing a second component of the fluid substance via a second conduit physically and chemically separated from the first conduit to the depth of the contaminated soil region,
    mixing the introduced first component and the introduced second component at the depth to produce the decontaminating fluid substance,
    injecting the decontaminating fluid substance at the selected pressure from at least one outlet valve, and
    directing the injected fluid substance from the outlet valve into the contaminated soil region between horizontal bars that protrude radially towards the contaminated soil region.

2. The method as claimed in claim 1, wherein injecting comprises repeated injections of the decontaminating fluid substance into at least the contaminated soil region.

3. The method as claimed in claim 1, wherein at least one of the two components contains permanganate.

4. The method as claimed in claim 1, wherein the decontaminating fluid substance is an oxidant.

5. A method for in-situ decontamination of a contaminated soil region which contains pollutants degradable with a decontaminating fluid substance through chemical oxidation, comprising:

selecting, with an injection device, an injection pressure from a plurality of available injection pressures, selecting, with the injection device, from among a plurality of available upper and lower axial boundaries, constraining propagation elevations for the decontaminating fluid substance through the selected axial boundaries, mixing components of the fluid substance, to produce the decontaminating fluid substance, between the selected upper and lower axial boundaries, injecting the decontaminating fluid substance at the selected pressure and within the selected axial boundaries from at least one outlet valve into at least the contaminated soil region, and directing the injected decontaminating fluid substance into the contaminated soil region with horizontal bars that protrude radially from and at least partly around the outlet valve towards the contaminated soil region.

6. The method as claimed in claim 5, wherein
at least one of the two components contains potassium permanganate.

7. The method as claimed in claim 5, wherein
the decontaminating fluid substance is a mixture of two components forming Fenton's reagent.

8. The method as claimed in claim 5, further comprising:
forming a hole to extend at least into the contaminated soil region, inserting a pipe into the hole to extend at least into the contaminated soil region, and filling an annular space between an inner wall of the hole and an outer wall of the pipe with a sheathing compound, to form a casing, wherein the injection pressure suffices to break open the casing when the decontaminating fluid substance is injected into the contaminated soil region via the pipe.

9. A system for in-situ decontamination of a contaminated soil region in a soil which contains degradable pollutants, comprising:

a source configured to provide a first component of a fluid substance and a second component of the fluid substance physically and chemically separated from the first component, an outlet valve arranged at a depth of the contaminated soil region in the soil, an injection line extending between the source and the outlet valve, a pump and a valve pipe arranged in the injection line, and a mixing device arranged in the injection line between the pump and the outlet valve, and configured to mix the first component and the second component to produce a decontaminating fluid substance, wherein the valve pipe comprises an outer wall with radially protruding horizontal bars configured to direct the fluid substance radially away from the valve pipe and into the contaminated soil region, and configured to delimit a propagation direction of the decontaminating fluid substance in the soil, wherein the injection line comprises a superterranean portion and a subterranean portion, and wherein the mixing device is arranged in the subterranean portion of the injection line.

10. The system as claimed in 9,
wherein the mixing device is arranged at a depth in the soil corresponding at least substantially to a depth in the soil of the outlet valve.

11. The system as claimed in claim 9, wherein
the valve pipe further comprises a sleeve pipe having at least one sleeve valve.

12. The system as claimed in claim 9, further comprising:
a casing of sheathing compound extending between the outer wall of the valve pipe and the contaminated soil region, and filling an annular space between the valve pipe and the soil, wherein the casing fixes the valve pipe in the soil, and
wherein the casing is configured to break open in response to propagation of the fluid substance radially away from the valve pipe.

13. A system for in-situ decontamination of a contaminated region which contains degradable pollutants in a soil, comprising:

a source configured to provide a first component and a second component of a decontaminating fluid substance, an outlet valve in a valve pipe and arranged at a depth in the soil of the contaminated region, an injection line extending between the source and the outlet valve, and configured to convey the first component and the second component in mutually separated conduits to a mixing device for the components arranged upstream of the outlet valve, a pump arranged in the injection line, and
horizontal bars extending radially from an outer wall of the valve pipe and at least partly circumferentially around the valve pipe towards the contaminated region, and configured to delimit elevations of propagation of the decontaminating fluid substance to a depth range within the soil that corresponds to the contaminated region.

14. The system as claimed in claim 13, wherein the horizontal bars extend fully circumferentially around the valve pipe.

15. The system as claimed in claim 13, wherein
the mixing device is arranged at the depth of the soil of the contaminated soil region.

16. The system as claimed in claim 13, wherein
the mixing device is arranged in an interior of the valve pipe.

17. The system as claimed in claim 13, further comprising:
a casing of sheathing compound extending between the outlet valve and the contaminated soil region, and filling an annular space between the valve pipe and the soil, wherein the casing fixes the valve pipe in the soil, and
wherein the casing is configured to break open in response to the propagation of the decontaminating fluid substance.

* * * * *